United States Patent [19]

Salame et al.

[11] 4,174,043

[45] Nov. 13, 1979

[54] NITRILE PREFORMS AND CONTAINERS AND PROCESS IMPROVEMENTS FOR FORMING SAME

[75] Inventors: Morris Salame, Windsor; Samuel Steingiser, Bloomfield, both of Conn.

[73] Assignee: Monsanto Company, St. Louis, Mo.

[21] Appl. No.: 850,364

[22] Filed: Nov. 10, 1977

[51] Int. Cl.$^2$ .............................................. B65D 23/00
[52] U.S. Cl. ..................................... 215/1 C; 264/22; 428/35; 428/36; 428/522
[58] Field of Search .................. 428/35, 36, 463, 522; 264/22, 164; 215/1 C; 426/106, 397

[56] References Cited

U.S. PATENT DOCUMENTS

| | | | |
|---|---|---|---|
| 3,754,851 | 8/1973 | Reilly et al. | 264/98 |
| 3,870,802 | 3/1975 | Harris et al. | 426/106 |
| 3,900,120 | 8/1975 | Sincock | 215/1 C |

FOREIGN PATENT DOCUMENTS 1367245  9/1974  United Kingdom.

OTHER PUBLICATIONS

European Polymer Journal, 1971, pp. 401–404, "Radiation-Induced Reactions of Monomer in Bulk Polymethylmethacrylates".

Primary Examiner—James J. Bell
Attorney, Agent, or Firm—Michael J. Murphy

[57] ABSTRACT

In forming containers by distending preforms of nitrile thermoplastic material at molding temperature, the improvement comprising exposing such preforms to low dosage radiation to reduce residual nitrile monomer in the thermoplastic material and then distending the irradiated preforms to cause HCN generated during irradiation to flash off in forming the container. The containers formed have unusually low concentrations of residual nitrile monomer as well as extractable HCN making them especially suitable for packaging foods, beverages, pharmaceuticals and the like. The irradiated preforms from which such containers are made have similarly low residual nitrile monomer levels.

48 Claims, 5 Drawing Figures

NITRILE PREFORMS AND CONTAINERS AND PROCESS IMPROVEMENTS FOR FORMING SAME

BACKGROUND OF THE INVENTION

This invention relates to improvements in forming containers of nitrile thermoplastic material and more particularly to process improvements rendering the containers more suitable for packaging environmentally sensitive materials such as foods, beverages, pharmaceuticals and the like, as well as the resulting containers and preforms for forming same.

It is known and desirable to form containers such as bottles, cans, tubs, trays and the like from shaped preforms by distending them while at molding temperature in a mold cavity into container form. In packaging environmentally sensitive or disintegratable materials such as, for example, foods, beverages, pharmaceuticals and the like, it is also known to use polymers comprising at least about 20 weight percent polymerized nitrile-group-containing monomer because of their resistance to oil and grease as well as their attractive oxygen, water and strength properties. In forming and processing these and other synthetic polymers, trace amounts of unpolymerized residual monomer are invariably present which can be carried over into the end container product and this can present problems if such monomers are deemed hazardous to health and/or safety by regulatory agencies in the sense of diffusing out of the plastic into the contents of the package.

As noted in U.S. Pat. Nos. 3,870,802 and 3,974,247, nitrile polymer resins can also contain trace though detectable amounts of hydrogen cyanide (HCN) which may be effectively scavenged by having a formaldehyde, styrene oxide or like compound in contact with the resin during forming thereby avoiding imparting undesirable taste otherwise caused by such HCN to environmentally sensitive contents intended for human consumption which are packaged in such resins.

It is likewise known before this invention that exposure of bottles formed of such nitrile resin to low dosage electron beam radiation is effective in reducing residual acrylonitrile monomer by causing it to directly polymerize in place in the solid polymer walls. However, it has also been determined that such exposure causes undesirable side reactions of which generation of excess HCN is predominant, even with HCN scavengers present in the polymer at the time of radiation exposure. Thus, though a promising approach exists toward solving the problem of unpolymerized nitrile monomer in nitrile thermoplastic materials, another problem has developed requiring solution if the attractive packaging properties of these resins are to be further exploited.

SUMMARY OF THE INVENTION

Now improvements have been developed in a process utilizing electron beam radiation to reduce residual nitrile monomer in containers of nitrile thermoplastic material, which improvements minimize the level of extractable HCN in such containers. The term "nitrile thermoplastic material" as used herein comprises a polymer containing at least 20 weight percent of a polymerized nitrile-group-containing monomer.

Accordingly, a principal object of this invention is to provide improvements in a process utilizing electron beam radiation to reduce residual nitrile monomer in containers formed of nitrile thermoplastic material, which improvements are primarily directed toward minimizing extracted HCN from the walls of such containers.

Another object is to provide such improvements as are applicable to a process for forming such containers from shaped preforms.

A further object is to accommodate relatively significant HCN levels in shaped nitrile thermoplastic materials generated during exposure to low dosage electron beam radiation.

An additional object is to provide containers of nitrile thermoplastic material having low levels of extractable HCN therein in combination with extremely low levels of nitrile monomer.

A further object is to provide improved preforms of nitrile thermoplastic material for conversion into such aforementioned containers.

Other objects of this invention will in part be obvious and will in part appear from the following description and claims.

These and other objects are accomplished in the process of forming containers from preforms of thermoplastic material comprising at least 20 weight percent of polymerized nitrile-group-containing monomer which includes distending the preforms while at molding temperature into containers in a mold, by providing the improvement which comprises exposing the preforms to low dosage electron beam radiation prior to distending whereby such radiation causes polymerization of such unpolymerized nitrile-group-containing monomer and such distending causes HCN generated during such irradiation to be reduced in the thermoplastic material.

From a product standpoint there is provided a container for environmentally sensitive materials formed of a thermoplastic material comprising at least 20 weight percent of polymerized nitrile-group-containing monomer, such container having levels of unpolymerized nitrile monomer no greater than about 0.8 ppm in the polymer and extractable HCN no greater than about 50 ppb based on extracting liquid.

Also provided is a preform for conversion into a container for environmentally sensitive materials formed of a thermoplastic material comprising at least 20 weight percent of polymerized nitrile-group-containing monomer and an effective amount of an HCN scavenger, the level of unpolymerized nitrile monomer in such preform being no greater than about 1.5 ppm based on the weight of the polymer.

BRIEF DESCRIPTION OF THE DRAWINGS

In describing the overall invention, reference will be made to the accompanying drawings wherein.

DETAILED DESCRIPTION OF THE ILLUSTRATED EMBODIMENT

Figure 4:
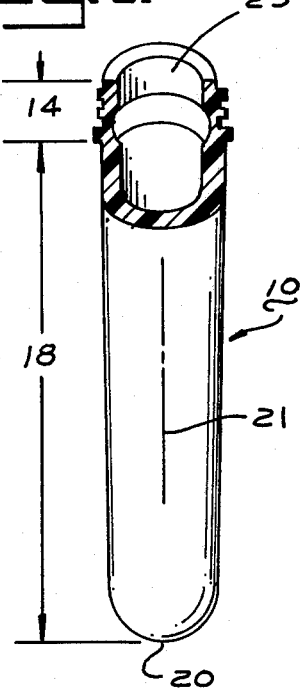
FIGS. 4 and 5 are elevational views of preform and bottle products according to the invention.
Figure 5:
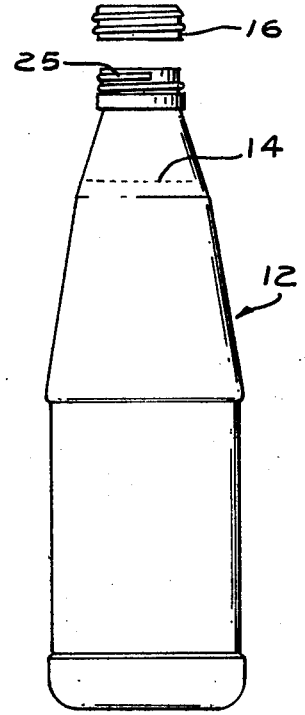

Referring now to the drawings, an elongated, tubular preform 10 of nitrile thermoplastic material is shown in FIG. 4 which can be distended into the shape of a container such as bottle 12 (FIG. 5). Bottle 12 after formation is charged with an environmentally sensitive material such as a food, pharmaceutical or beverage 14 after which a cap 16 is applied to threads 25 to protectively enclose contents 14 from the surroundings. Preform 10 is circular in cross section and includes body portion 18 closed at 20 at one end and open at opposite end 23 around which extends annular finish 14. In the embodiment illustrated, finish 14 is formed in the preform molding step and is not intended to be remolded with body 18 during formation of container 12, though it is within the scope of the invention to so mold the finish during container formation.

Shaped preforms according to the invention must be capable of reforming without substantial melt flow of the nitrile thermoplastic material occurring. The shape may vary considerably from the configuration in FIG. 4, with actual shape being primarily a function of that of the container to be molded therefrom. For example, such preforms may be planar, bulbar, ribbed, cup-shaped, bellshaped, conical, frustoconical, non-round in cross section, tapered along the length or of some like configuration, with either a varying or constant thickness. The configuration of FIG. 4 at thicknesses between about 0.1 to 0.6 cms. is preferred for convenient blow molding in a manner to be presently described into commercial sized containers such as bottles of about 120 to 3780 cc. capacity.

The preforms of the invention may be shaped by any conventional molding technique such as injection or blow molding, extrusion, thermoforming from sheet material either with or without mechanical plug assist, spin-welding, compression molding, vacuum forming and the like. Similarly, the packaging containers formed from the preforms may be shaped by conventional molding techniques involving a distension of the preform walls. In this respect, vacuum or pressure forming by drawing a sheet-like preform against the walls of a wide mouth die cavity may be used as well as known blow molding techniques to be further described. The particular remolding system or combination of systems chosen will usually be influenced by the configuration of the container which can, for example, take the form of a tray, tube, tub, cup, jar, can, bottle, jug or similar configuration, the choice of the latter in turn being primarily determined by the nature of the environmentally sensitive material to be packaged therein.

Figure 1:
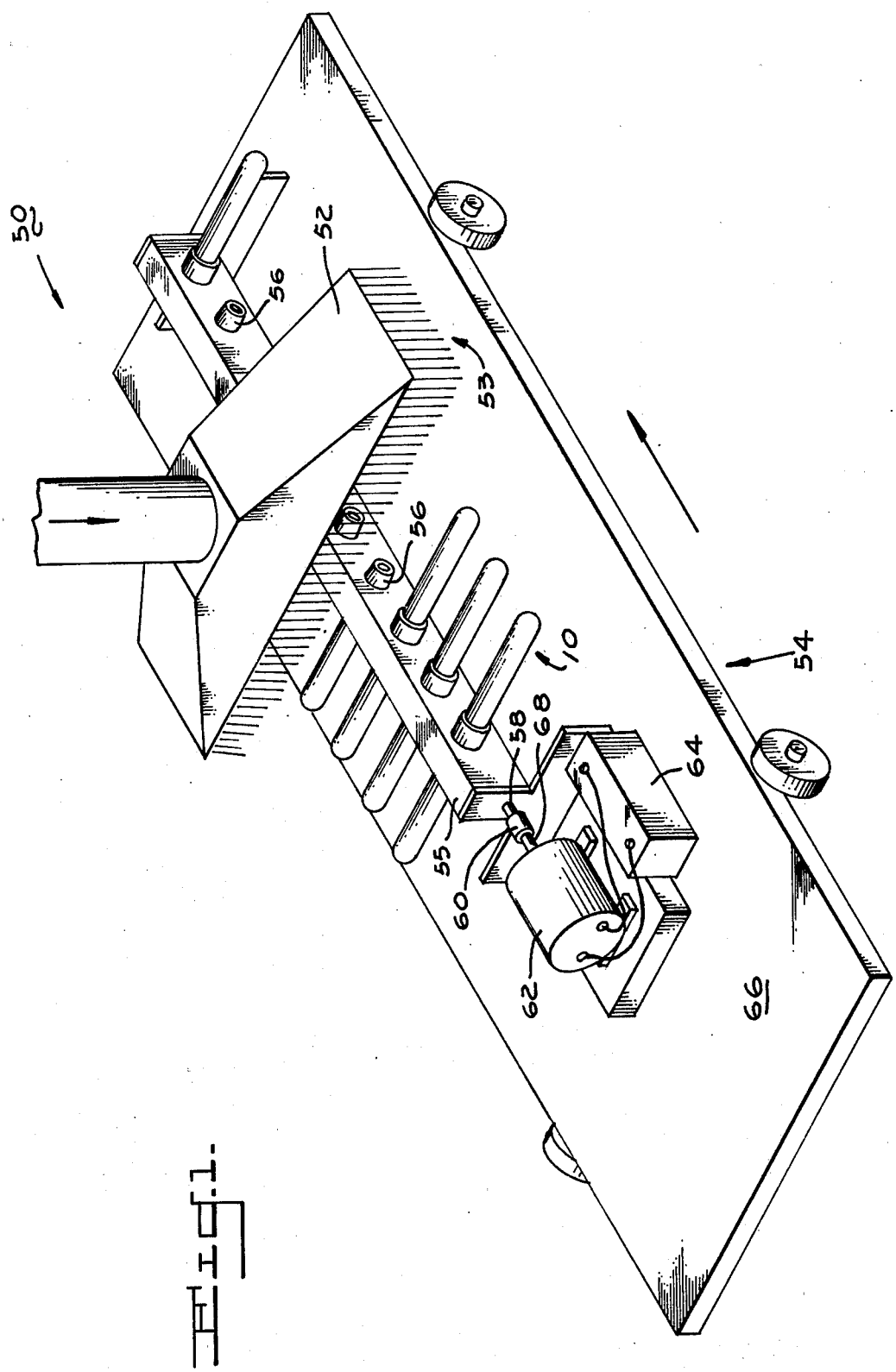
FIG. 1 is a schematic view of the initial step of the process of the invention.

Referring now to FIG. 1, preforms 10 prior to remolding are shown undergoing exposure to electron beam radiation according to the invention in treating station 50. Though it is preferred, as shown, to irradiate preforms 10 while they are at room temperature, it may be possible to do so at other preform temperatures. Electron beam generating equipment is well known and in brief comprises a closed system under vacuum which includes a filament or cathode generating electrons via passage of electric current therethrough. The electrons are accelerated into a high energy, high voltage beam via passage through a magnetic field and subsequently past a scanning magnet which rapidly sweeps the beam 53 across an electron permeable titanium window at the discharge end of the system toward the underlying preform product being irradiated below. In FIG. 1 such window is adjacent the lower end of scan horn 52 situated in a radiation vault through which the preforms pass while on a suitable transport mechanism such as wheeled cart 54 propelled by a conventional power source not shown. Significant extractable HCN is generated in the nitrile thermoplastic material during exposure to beam 53 and it is the purpose of this invention to minimize extractable HCN in finished container 12, the irradiation per se being desirable to polymerize and therefore reduce unreacted nitrile monomer in the nitrile thermoplastic material. In this last respect, electron beam radiation dosage levels of from about 0.01 to 1.0 and preferably from about 0.05 to 0.8 megarads are effective in the present invention to reduce residual nitrile monomer without excessive generation of HCN.

Figure 3:
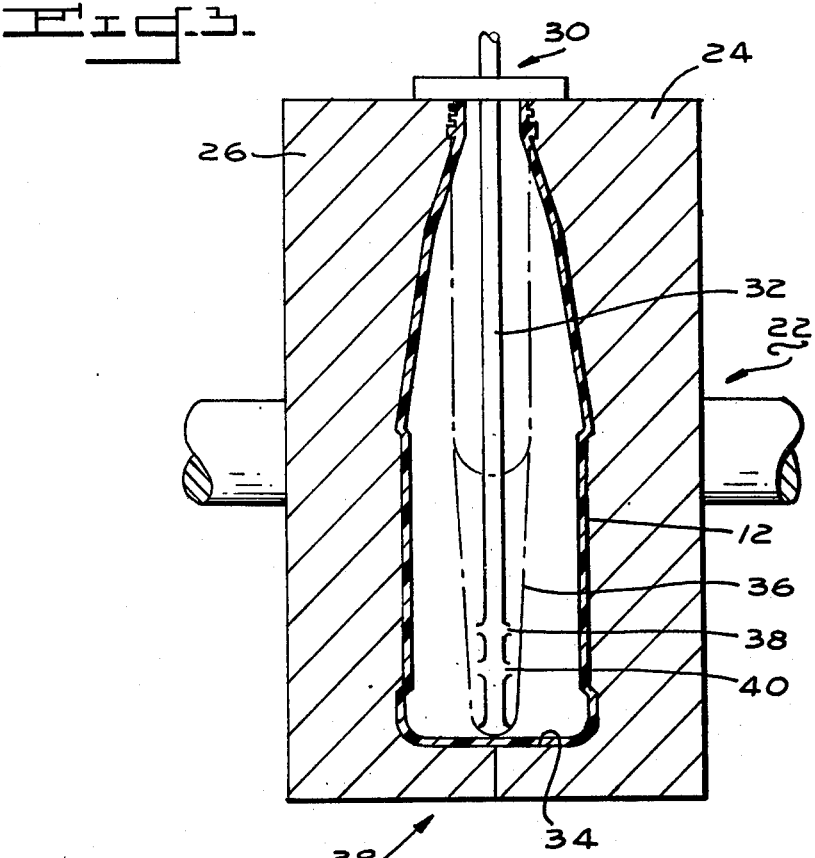
FIG. 3 is a view similar to FIG. 1 of a subsequent process step.

When the electron beam issues in the form of a curtain which is rectangular in cross section as in FIG. 1, a mechanism is preferably used to insure that all of the surfaces to be treated are directly exposed to the beam. With circular preforms 10, some means of rotating them about lengthwise axes 21 is preferred to promote such uniformity of exposure to beam 53. A system for accomplishing this is exemplarily shown in FIG. 1 and comprises elongated housing 55 having plural through-openings in which are seated sockets having protruding resilient stoppers 56 sized to be received in open ends 23 of preforms 10 and frictionally engaged with the inner wall surfaces around such openings. Each socket in each opening is pinned to a gear (not shown) within housing 55 which in turn meshingly cooperates with a worm gear portion on shaft 58 coupled at 60 to output shaft 68 of D.C. motor 62 powered by battery 64 seated on surface 66 of cart 54. Further details of the internal parts of housing 55 are shown in FIG. 3 of U.S. Pat. No. 4,050,887 which is incorporated herein by reference. Thus, as shaft 68 rotates each plug 56 engaging a preform 10 or bottle 12 will rotate a like amount.

An assembly for distending irradiated preforms 10 into containers 12 is shown in FIG. 3, and more particularly a stretch blow assembly 22 is shown for converting each preform 10 into a container 12 having walls which are molecularly oriented. This is accomplished by first enclosing preform 10 within partible sections 24, 26 of blow mold 28 while the preform is at molding temperature, and preferably while within the molecular orientation temperature range for the nitrile thermoplastic material of preform 10. Next, stretch mechanism 30 is moved into place over the open end of preform 10 and blow mold 28, whereupon telescopic rod member 32 is extended by a suitable mechanism, not shown, in order to draw preform end 20 forward against base portion 34 of the internal cavity of blow mold 28 thereby axially stretching body portion 18 in the manner illustrated in phantom at 36. Simultaneously therewith or preferably immediately thereafter a blowing medium such as compressed air is admitted to the preform through openings 28, 40 of rod 32 to radially stretch the axially stretched preform outwardly against the cavity walls into the shape of bottle 12. It is within the scope of the invention to eliminate rod 32 and achieve stretching solely by means of the pressurized blowing medium.

The temperature of the irradiated preform at the time of distending is rather important in the invention since on one hand it is desirable to have it high to maximize flash removal of HCN generated in the prior irradiating step, while on the other hand if too high nitrile monomer which was reduced in such irradiating step may again be generated through partial decomposition of the nitrile polymer. In any event, such temperature should not be so high that flow occurs in the nitrile thermoplastic material since then it will be difficult to support the preform both in the container mold and during temperature conditioning such as in instances where it is being brought up to molding temperature from a lower temperature. In general, molding temperatures for nitrile thermoplastic materials should be between about 100° to 175° C. and preferably within the molecular orientation temperature range of between about 130° to 150° C. in order to provide improved strength in the walls of the molded container while keeping the remolding or blowing temperature relatively low to avoid formation of nitrile monomer yet not so low as to be relatively ineffective in promoting flash vaporization of HCN during distension.

The extent of flash removal of HCN during preform distending is, in addition to preform temperature, dependent on the amount the preform is stretched in forming the portion of the finished container of greatest dimensions, such stretching and size enlargement reducing the wall thickness of the preform and simultaneously exposing HCN molecules trapped within the preform walls to the atmosphere for flash vaporization. The extent of stretching may vary within wide limits and depends primarily on the dimensions of the initial preform and finished container and whether molecular orientation is desired in the latter. In forming containers of nitrile thermoplastic material within the 120 to 3780 cc. size range, preform stretch amounts (i.e. in the axial plus lateral directions) should be between about 130 to 280%. In this respect, the percent axial stretch of an elongated preform provided with a molded finish is determined from the container length beneath its finish minus the preform length beneath such finish divided by the preform length beneath such finish, while percent lateral stretch is determined from the maximum container diameter less the maximum preform diameter divided by the maximum preform diameter, with combined stretch determined by adding such axial and lateral stretch percents.

Electron beam radiation of shaped preforms is critical in order to reduce HCN due to the wall thickness reduction and surface area increase occurring in distending the preforms into container shape. As will be apparent from Examples following, irradiation of containers molded from control preforms which had not been irradiated results in substantially greater levels of extractable HCN in the containers. On the other hand, irradiation of nitrile thermoplastic material in particle form prior to melt processing during conversion into a shaped preform will not per se provide the desired overall nitrile monomer reduction effect intended, since nitrile monomer can again be generated during such melt processing step in forming the preform.

For food, beverage, pharmaceutical and like packaging applications an HCN scavenging material should preferably be present in the nitrile thermoplastic material of the shaped preforms during irradiation in order to synergistically react with a portion of the HCN generated. The amount of such scavenging material, when considered with the flash removal of HCN occurring during preform remolding, must be sufficient to maintain extractable HCN below levels which impart taste to human-consumable contents in the end package. In addition, with HCN scavenging material present in the preform it has another chance to react with the HCN generated during irradiation at the time of distension at elevated temperature in the container mold and this can also be effective in lowering extractable HCN in the final container. Such HCN scavenging materials and methods for incorporating them into nitrile thermoplastic materials are typically disclosed in U.S. Pat. Nos. 3,870,802; 3,974,297, and disclosure number RD 12522, pages 17, 18 of the September 1974 issue of Research Disclosure, published in Britain by Industrial Opportunities Ltd., the content of each of the latter being incorporated herein by reference. The effective concentration of HCN scavenger is generally within the ranges disclosed in the aforementioned patents and publication and preferably is between about 900 to 1500 ppm of resin in order to effectively scavenge HCN without adversely imparting taste to the package contents due to the HCN scavenger per se in the resin. In general, the level of extractable HCN in an irradiated preform containing an HCN scavenger in an amount effective for purposes of this invention and which is to be molded into a container for packaging foods, beverages, and related substances will be on the order of 500 to 1500 ppm based on the weight of the polymer, in order to avoid imparting undesirable taste to the packaged contents from both the scavenging material and the HCN.

The level of extractable HCN in the preforms and containers of the invention can drop as a function of time and temperature of the part during storage before testing but such reduction is considered uneconomical in terms of providing the conditions for achieving it as well as insignificant when compared to the order of magnitude greater reduction from preform distension according to the invention. In any event, any HCN loss from preforms will usually be substantially less than that from containers stored for equivalent periods due to the differences in thickness involved. In this respect, as an example of HCN loss with time/temperature, extractable HCN levels of 57 and 76 ppb based on extract were measured in irradiated bottles stored after forming at normal room temperature conditions for 3 days before testing whereas levels of 32 and 41 ppb respectively were obtained on bottles formed under the same condition but stored for 21 days before testing.

The nitrile thermoplastic material of the preforms and containers of this invention comprises at least 20 weight percent of a polymerized nitrile-group-containing monomer. More particularly, such nitrile thermoplastic materials comprise at least one nitrile monomer having the formula:

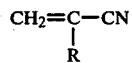

wherein R is hydrogen, an alkyl group having 1 to 4 carbon atoms, a halogen or another CN group. Such compound include acrylonitrile, methacrylonitrile, ethacrylonitrile, propacrylonitrile, alpha chloronitrile, etc. as well as mixtures thereof. The most preferred nitriles are acrylonitrile and methacrylonitrile and mixtures thereof.

The nitrile compositions generally will contain one or more comonomers copolymerizable with the nitrile monomers including monovinylidene aromatic hydrocarbon monomers of the formula:

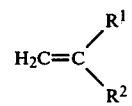

wherein $R^1$ is hydrogen, chlorine or methyl and $R^2$ is an aryl group of 6 to 10 carbon atoms and may also contain substituents such as halogen as well as alkyl groups attached to the atomatic nucleus, e.g. styrene, alpha methylstyrene, vinyl toluene, alpha chlorostyrene, ortho chlorostyrene, meta chlorostyrene, para chlorostyrene, ortho methylstyrene, para methylstyrene, ethyl styrene, isoproyl styrene, dichloro styrene, vinyl naphthalene, etc.

Additional useful comonomers include the lower alpha olefins of from 2 to 8 carbon atoms, e.g. ethylene, propylene, isobutylene, butene-1, pentene-1 and their halogen and aliphatic substituted derivatives, e.g. vinyl chloride, vinylidene chloride, etc; acrylic acid and methacrylic acid and the corresponding acrylate and methacrylate alkyl esters wherein the alkyl group contains from 1 to 4 carbon atoms, e.g. methyl acrylate, ethyl acrylate, propyl acrylate, methyl methacrylate, etc. Other comonomers which may be used include vinyl esters such as vinyl acetate; and alkyl vinyl ethers wherein the alkyl group contains from 1 to 4 carbon atoms such as methyl vinyl ether, ethyl vinyl ether etc. and mixtures of the foregoing.

Additional comonomers useful in the practice of this invention are those comonomers which contain a mono- or di-nitrile function. Examples of these include methylene glutaronitrile, 2,4-dicyanobutene-1, vinylidene cyanide, crotonitrile, fumaronitrile, maleonitrile. The preferred comonomers are the monovinylidene aromatic hydrocarbons, lower alpha olefins and acrylic and methacrylic acid and the corresponding acrylate and methacrylate esters with the monovinylidene aromatic hydrocarbons being more particularly preferred. More specifically preferred are styrene and alpha methylstyrene. Another preferred composition is that wherein a terpolymer of nitrile, styrene and vinyl ether is used such as disclosed in U.S. Pat. No. 3,863,014.

Optionally, the high nitrile materials may contain from 0 to about 25% by weight of a synthetic or natural rubber component such as polybutadiene, isoprene, neoprene, nitrile rubbers, acrylate rubbers, natural rubbers, acrylonitrile-butadiene copolymers, ethylene-propylene copolymers, chlorinated rubbers, etc. which is used to strengthen or toughen the high nitrile packaging materials. This rubbery component may be incorporated into the polymeric packaging material by any of the methods which are well known to those skilled in the art, e.g. direct polymerization of monomers, grafting the nitrile monomer onto the rubbery backbone, poly-bend of a rubber graft polymer with a matrix polymer, etc.

The preferred nitrile thermoplastic materials for packaging foods, beverages, pharmaceuticals and the like requiring excellent oxygen and water vapor barrier properties are those containing a major proportion of from about 55 to about 85% by weight, based on the total polymer weight, of an acrylonitrile and/or methacrylonitrile monomer (wherein the weight percent of methacrylonitrile is calculated as acrylonitrile). When acrylonitrile is used as the sole nitrile monomer the preferred range is from about 60 to about 83% by weight whereas with methacrylonitrile the preferred range is from about 70 to about 98% by weight of methacrylonitrile which corresponds to about 55 to about 78% by weight of nitrile monomer calculated as acrylonitrile.

This invention also contemplates the use of other additives and ingredients in the nitrile thermoplastic materials which do not adversely affect the taste properties of the resulting packaging container. Examples of such ingredients include thermal stabilizers, light stabilizers, dyes, pigments, plasticizers, fillers, antioxidants, lubricants, extrusion aids, etc.

The actual measurements of the amounts of HCN, of residual nitrile monomer in the walls of the preforms and containers and of nitrile monomer extracted by the extracting liquid are not considered part of this invention. In this regard, any method capable of detecting nitrile monomer to 10 ppb and HCN to 20 ppb can be used. These methods, which are known to those skilled in the art, include colorimetric, polarographic, gas chromatographic, fluorometric and electrochemical measurements. Methods for measuring: (a) residual acrylonitrile monomer in acrylonitrile polymers to 1 ppm; (b) extractable acrylonitrile monomer to 10 ppb in the extract and (c) extractable HCN to 20 ppb in the extract are available to the public on request from the U.S. Food and Drug Administration and are described in and part of Food and Drug Administration Regulation No. 121.2629 which is referenced in The Federal Register Vol. 40, No. 30.

The tests described in the Examples following using a 3% acetic acid solution (an FDA food simulant for acid type beverages and foods) as the extracting liquid, illustrate one of the more difficult packaging applications where there is a high probability of extracting HCN and nitrile monomer. In other less difficult applications, such as the packaging of dry rice, oranges, bananas, aspirin, etc. such rigorous tests for determination of extractable HCN may not be necessary. At any rate, those skilled in the art, upon reading the present specification, can readily select test samples and test conditions to suit their particular needs.

The following Examples are set forth in illustration of the invention and should not be construed as limitations thereof. All parts and percentages of resin and HCN scavenging compound are by weight unless otherwise specified. Where convenient, residual acrylonitrile monomer is abbreviated as RAN, megarads as MR, and 3% acetic acid is the extracting liquid into which the extrctable HCN and RAN diffuses from the walls of the preforms and/or containers. The amount of HCN scavenging compound is based on the weight of the nitrile polymer. The ppb values for extracted HCN and RAN refer to nanograms of HCN and RAN per cc. of extracting liquid.

EXAMPLES 1 to 4

A nitrile copolymer resin containing 70 parts acrylonitrile and 30 parts styrene prepared by conventional aqueous polymerization techniques is blended with various amounts of a formaldehyde compound for scavenging HCN, such compound being identified as a condensate of para-toluene sulfonamide and formaldehyde (1.1 to 1.0 mole ratio) having a molecular weight of about 600, commercially available from Monsanto Company as Santolite MHP, and abbreviated in Table I as MHP. The blend is injection molded at temperatures in the range of from 230° to 270° C. into preforms shaped as in FIG. 4 and then cooled to room temperature. The preforms have an average wall thickness, calculated as the arithmetic mean of the thickness adjacent (i) the finish and (ii) the closed end, of 0.35 cms.

A number of such preforms while at such room temperature are frictionally engaged with rotatable rubber stoppers associated with a support housing and advanced at varying linear velocities beneath a scan horn from which an electron beam about 14 inches wide is issuing while rotating at about 3 rev. per min. about their lengthwise axes, all in the manner generally depicted in FIG. 1. A Dynamitron electron beam generating system rated at 3 million electron volts is used which is commercially available from Radiation Dynamics Inc., Melville, N. Y. 11746. Dosage levels were varied by varying the residence time under the beam as well as the amperage level of the Dynamitron. Bottles formed as described in the next paragraph from non-irradiated preforms were similarly exposed to the electron beam at the same dosage levels as the preforms to serve as controls.

The body portions (exclusive of the finish 14) of the irradiated preforms and non-irradiated control preforms are then heated to the molecular orientation temperature range of between 132° to 138° C. by passage through an oven before banks of radiant heaters, then transferred while within such temperature range to a stretch-blow assembly as in FIG. 3 and distended into 32 ounce (945 cc.) beverage bottles shaped as in FIG. 5.

Test bottles formed from irradiated preforms, and control bottles exposed to the same levels of radiation as are the preforms which formed the test bottles, are rinsed with water, filled with 32 ounces (945 cc.) of 3% acetic acid and heated for 5 days at 49° C. (120° F.). The bottles and contents are then cooled to room temperature and the amount of HCN extracted by the extracting liquid in ppb is determined. These tests for HCN extraction are carried out within one month of forming with the bottles being stored in the interim at room temperature conditions of about 23°–25° C. and 30–50% relative humidity. Other empty test bottles, control bottles and test irradiated preforms are rinsed, dissolved in acetone and the acetone solution analyzed for the amount of RAN present in the acetone solution in ppm based on the original total polymer weight.

The results of the tests are tabulated as follows:

HCN present in irradiated bottles molded from non-irradiated, HCN-scavenger-containing preforms. More particularly, such significant HCN reduction is achieved without increasing RAN in the bottles over that present in the preforms. The lower values of RAN in bottles formed from irradiated preforms in comparison with RAN values in irradiated bottles from non-irradiated preforms are believed to be due to a greater treating efficiency of the preforms resulting in their substantially greater thickness absorbing more of the RAN-reducing electron beam radiation than the thinner walled bottles.

In accordance with the invention, and as supported by the data in Table I, the containers of nitrile thermoplastic material have a level of unpolymerized nitrile monomer of no greater than about 0.8 ppm and preferably no greater than 0.5 ppm, based on the total weight of the polymer, which renders them especially safe for packaging contents intended for human consumption and a level of extractable HCN based on extracting liquid no greater of than 50 ppb. With respect to taste test details regarding bottles of nitrile thermoplastic material in which a cola beverage is placed, as described in col. 14, lines 12–31 of U.S. Pat. No. 3,870,802, improvements are obtained in HCN taste properties when extractable HCN content is less than about 50 ppb and most particularly when less than about 20 ppb based on extracting liquid. For purposes of the invention, these levels of extractable HCN are obtainable when containers within the scope of the invention are tested as above described within 30 days of manufacture, with any storage before testing being at normal room temperature conditions of 25° C. and 50°% relative humidity. In addition, preforms according to the invention which have been irradiated via exposure to low dosage electron beam radiation have an unpolymerized nitrile monomer level of no greater than about 1.5 ppm based on the total weight of the polymer.

In order to show the extremely low levels of extract-

TABLE I

| Example | Description of Article | MHP Scavenger (ppm) | Radiation Dosage (MR) | | | | | | | |
|---|---|---|---|---|---|---|---|---|---|---|
| | | | 0 | 0.05 | 0.10 | 0.20 | 0 | 0.05 | 0.10 | 0.20 |
| | | | RAN(ppm) | | | | HCN(ppb) | | | |
| 1[(1)] | irradiated preform | ↑ | 12.0 | 6.0 | 1.7 | 1.0 | inapplicable | | | |
| | non-irradiated bottle from irradiated preform | <900 | 9.4 | 6.4 | 0.7 | 0.3 | 21 | 32 | 35 | 59 |
| | irradiated bottle from non-irradiated preform | ↓ | 11.0 | 6.0 | 1.6 | 0.1 | 21 | 44 | 70 | 128 |
| 2 | irradiated preform | ↑ | 9.2 | 7.6 | 0.7 | 0.3 | inapplicable | | | |
| | non-irradiated bottle from irradiated preform | 900 | 8.4 | 2.9 | 0.6 | <0.1 | 3 | 13 | 16 | 23 |
| | irradiated bottle from non-irradiated preform | ↓ | 7.3 | 5.6 | 0.87 | 0.28 | 3 | 34 | 48 | 91 |
| 3[(2)] | irradiated preform | ↑ | 15.0 | 11.0 | 2.9 | 1.2 | inapplicable | | | |
| | non-irradiated bottle from irradiated preform | 1500 | 11.0 | 14.0 | 3.6 | 0.5 | 2 | 10 | 12 | 15 |
| | irradiated bottle from non-irradiated preform | ↓ | 12.4 | 13.0 | 6.0 | 0.12 | 2 | 23 | 36 | 58 |
| 4[(3)] | irradiated preform | ↑ | 13.5 | 9.9 | 7.4 | 0.8 | inapplicable | | | |
| | non-irradiated bottle from irradiated preform | 1500 | 9.7 | 5.5 | 2.6 | 1.2 | 2 | 6 | 8 | 12 |
| | irradiated bottle from non-irradiated preform | ↓ | 10.0 | 5.0 | 1.1 | 0.3 | 2 | 17 | 23 | 41 |

[(1)]Contains:
(i) 0.5% based on the weight of total polymer of an impact modifier commercially available from Borg Warner Company as Cycopac 930 comprising an acrylonitrilerubber graft copolymer.
(ii) 10% based on the weight of total polymer of a rework form of the original polymer.
[(2)]Contains 20% based on the weight of total polymer of a rework form of the original polymer.
[(3)]Contains 1% based on the weight of total polymer of rubber crumbs comprising polybutadiene rubber.

The data in Table I clearly shows the significant reduction in HCN extractable from bottles molded from preforms containing an HCN scavenger and which have been previously exposed to low dosage electron beam radiation in comparison with the extractable able RAN in containers of the invention, bottles with no greater than 50 ppb extractable HCN are selected from Examples 1–4 which have RAN levels no greater than 0.8 ppm. These bottles are washed, dried, charged to the normal fill level with 3% acetic acid in water, capped and stored for 30 days at 49° C. at which time the contents are sampled, injected into a gas chromatograph apparatus and analyzed by methods disclosed in the aforementioned Food Master File No. 124. Results indicate less than 10 parts of acrylonitrile monomer present per billion parts of simulating solvent. At such RAN and extractable HCN levels, it is believed there will be no adverse taste effects on a cola beverage packaged in such bottles and tested under the conditions set forth in U.S. Pat. No. 3,870,802, col. 14, lines 12–31.

Figure 2:
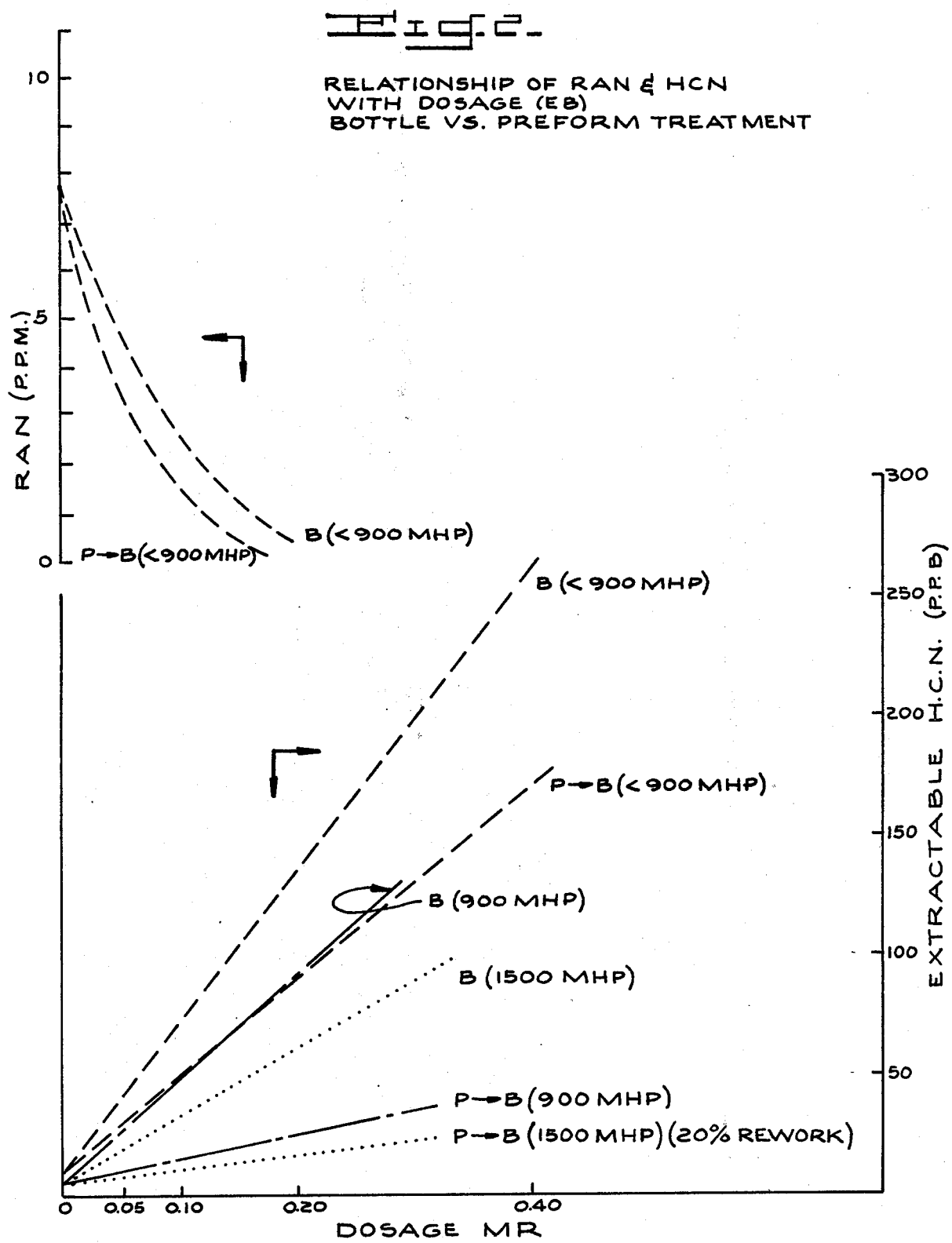
FIG. 2 is a graphical illustration of electron beam dosage versus levels of residual materials in preforms and bottles.

FIG. 2, which includes the data of Examples 1-4 and other related data, graphically summarily illustrates for various radiation dosages and RAN levels in the 70/30 weight percent polymerized acrylonitrile/styrene of the Examples, the significant reduction in extractable HCN in bottles made from electron beam-radiated preforms in comparison with electron beam-radiated bottles made from non-irradiated preforms. In this respect, the lines marked P→B represent the relationship between radiation dosage and HCN levels in bottles made from irradiated preforms containing the noted levels of MHP scavenger for HCN, whereas the lines marked B represents such levels in irradiated bottles made from preforms which had not been treated with radiation. Thus, as shown in FIG. 2, at 1500 ppm MHP in the 70/30 AN/S polymer containing 20% regrind, bottles formed from preforms treated with dosages of 0.20 MR will have an extractable HCN content of about 20 ppb (from the y axis on the lower right side) and a residual RAN monomer level of substantially zero (from the y axis on the upper left side) whereas bottles exposed to the same 0.20 MR radiation but formed from preforms having the same 1500 ppm MHP for HCN scavenging but which had not been so treated with radiation will also have an RAN level of substantially zero but an extractable HCN level of about 65 ppb.

It is obvious that many variations may be made in the products and processes set forth above without departing from the spirit and scope of this invention.

What is claimed is:

1. In the process of forming containers from preforms of thermoplastic material comprising at least about 20 weight percent of polymerized nitrile-group-containing monomer which includes distending the preforms while at molding temperature into containers in a mold,
   the improvement which comprises:
   exposing the preforms to low dosage electron beam radiation prior to said distending;
   whereby said radiation causes polymerization of unpolymerized nitrile-group-containing monomer and said distending causes HCN generated during such irradiation to be reduced in the thermoplastic material.

2. The process of claim 1 wherein the preforms have a thickness of beteen about 0.1 to 0.6 cms.

3. The process of claim 1 wherein the thermoplastic material during distension is at molecular orientation temperature.

4. The process of claim 3 wherein the dosage of electron beam radiation is between about 0.01 to about 1.0 megarads.

5. The process of claim 4 wherein a formaldehyde compound is present in the thermoplastic material at the time of exposure to said radiation.

6. The process of claim 5 wherein the nitrile-group-containing monomer is selected from the group of monomers consisting of acrylonitrile, methacrylonitrile and mixtures thereof.

7. The process of claim 6 wherein the nitrile-group-containing monomer is acrylonitrile.

8. In the process of forming containers for environmentally sensitive materials from preforms of thermoplastic material comprising at least 20 weight percent of polymerized nitrile-group-containing monomer which includes distending the preforms while at blow molding temperature into the containers in a mold,
   the improvement minimizing unpolymerized nitrile-group-containing monomer and extractable HCN in the walls of the containers which comprises:
   distending irradiated preforms containing no greater than about 1.5 ppm of unpolymerized nitrile-group-containing monomer based on the weight of total polymer in the cavity of a mold into container form whereby said HCN is reduced without increasing said unpolymerized monomer.

9. The process of claim 8 wherein extractable HCN based on extracting liquid, during distension, is reduced to no greater than about 50 ppb.

10. The process of claim 8 wherein the thickness of the preforms is between about 0.1 to 0.6 cms.

11. The process of claim 8 wherein at least portions of the preforms are at molecular orientation temperature during distension.

12. The process of claim 11 wherein extractable HCN based on extracting liquid, during distension, is reduced to no greater than about 50 ppb.

13. The process of claim 12 wherein the dosage of electron beam radiation is between about 0.05 to about 0.8 megarads.

14. The process of claim 13 wherein an effective amount of an HCN scavenging compound is present in the thermoplastic material during exposure to said irradiation.

15. The process of claim 13 wherein the nitrile-group-containing monomer is selected from the group of monomers consisting of acrylonitrile, methacrylonitrile and mixtures thereof.

16. The process of claim 15 wherein the nitrile-group-containing monomer is acrylonitrile.

17. The process of claim 16 wherein the thermoplastic material comprises from about 55 to about 85 weight percent acrylonitrile.

18. In the process of forming containers for foods, beverages, pharmaceuticals and the like from tubular preforms comprising a major proportion of polymerized nitrile-group-containing monomer which includes distending the preforms while at molding temperature into the containers in a mold,
   the improvement wherein unpolymerized nitrile-group-containing monomer and extractable HCN in the walls of the containers are reduced which comprises:
   distending irradiated preforms containing (a) no greater than about 1.5 ppm unpolymerized nitrile-group-containing monomer based on the total weight of the polymer and (b) a detectable extractable HCN content, in the cavity of a mold into container form whereby said HCN content is reduced without increasing said unpolymerized monomer.

19. The process of claim 18 wherein the preforms before distending have a thickness of between about 0.1 to 0.6 cms.

20. The process of claim 18 including rotating the preforms about their longitudinal axes during exposure to the radiation.

21. An irradiated preform for conversion into a container for environmentally sensitive materials, said preform being formed of a thermoplastic material comprising at least 20 weight percent of a polymerized nitrile-group-containing monomer and an effective amount of an HCN scavenger, the level of unpolymerized nitrile monomer in such preform being no greater than about 1.5 ppm based on the total weight of the polymer.

22. The preform of claim 21 wherein the nitrile-group-containing monomer is selected from the group of monomers consisting of acrylonitrile, methacrylonitrile and mixtures thereof.

23. The preform of claim 21 wherein the HCN scavenger is a formaldehyde compound.

24. The preform of claim 22 wherein the nitrile-group-containing monomer is acrylonitrile.

25. The preform of claim 22 wherein the nitrile-group-containing monomer comprises from about 55 to about 85 weight percent of the polymerized monomer.

26. The preform of claim 25 wherein the monomer is acrylonitirle.

27. The preform of claim 26 having a tubular shape.

28. A container for environmentally sensitive materials formed of an irradiated thermoplastic material comprising at least 20 weight percent of a polymerized nitrile-group-containing monomer, said container having levels of unpolymerized nitrile monomer and extractable HCN of no greater than about 0.8 ppm based on the total weight of the polymer and about 50 ppb based on extracting liquid respectively.

29. The container of claim 28 wherein the nitrile-group-containing monomer is selected from the group of monomers consisting of acrylonitrile, methacrylonitrile and mixtures thereof.

30. The container of claim 28 wherein the extractable HCN based on extracting liquid is no greater than about 20 ppb.

31. The container of claim 28 wherein the level of unpolymerized nitrile monomer is no greater than about 0.5 ppm.

32. The container of claim 29 wherein the nitrile-group-containing monomer is acrylonitrile.

33. The container of claim 29 wherein the nitrile-group-containing monomer comprises from about 55 to about 85 weight percent of the polymerized monomer.

34. The container of claim 33 wherein the monomer is acrylonitrile.

35. The container of claim 33 wherein at least portions of the walls thereof are molecularly oriented.

36. The container of claim 28 including a food, beverage, pharmaceutical or the like packaged therein.

37. The container of claim 29 including a food, beverage, pharmaceutical or the like packaged therein.

38. The container of claim 33 including a food, beverage, pharmaceutical or the like packaged therein.

39. The container of claim 34 including a food, beverage, pharmaceutical or the like packaged therein.

40. The container of claim 39 wherein the level of acrylonitrile monomer in the contents is less than 10 ppb based on extracting liquid after 30 days at 49° C.

41. Containers formed by the process of claim 1.

42. Containers formed by the process of claim 8.

43. Containers formed by the process of claim 18.

44. Environmentally sensitive substances such as foods, beverages, pharmaceuticals or the like packaged in the containers of claim 41.

45. Environmentally sensitive substances such as foods, beverages, pharmaceuticals or the like packaged in the containers of claim 32.

46. Environmentally sensitive substances such as foods, beverages, pharmaceuticals or the like packaged in the containers of claim 43.

47. The container of claim 28 wherein the environmentally sensitive materials comprise foods, pharmaceuticals, beverages, and the like.

48. The container of claim 28 having a capacity of about 120 to 3780 cubic centimeters.

* * * * *